(12) United States Patent
Stoliaroff-Pepin et al.

(10) Patent No.: US 12,546,235 B2
(45) Date of Patent: Feb. 10, 2026

(54) SYSTEM FOR SEALING AND DRAINING OIL LEAKS FOR A TURBOMACHINE BEARING ENCLOSURE

(71) Applicant: SAFRAN AIRCRAFT ENGINES, Paris (FR)

(72) Inventors: Nicolas Stoliaroff-Pepin, Moissy-Cramayel (FR); Eddy Stéphane Joël Fontanel, Moissy-Cramayel (FR); Sébastien Gameiro, Moissy-Cramayel (FR); Paco Maurer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/838,290

(22) PCT Filed: Feb. 21, 2023

(86) PCT No.: PCT/FR2023/050244
§ 371 (c)(1),
(2) Date: Aug. 14, 2024

(87) PCT Pub. No.: WO2023/156752
PCT Pub. Date: Aug. 24, 2023

(65) Prior Publication Data
US 2025/0163819 A1     May 22, 2025

(30) Foreign Application Priority Data
Feb. 21, 2022    (FR) ..................................... 2201525

(51) Int. Cl.
*F01D 25/18*     (2006.01)
*F01D 11/02*     (2006.01)
*F01D 25/16*     (2006.01)

(52) U.S. Cl.
CPC .............. *F01D 25/18* (2013.01); *F01D 11/02* (2013.01); *F01D 25/16* (2013.01); *F05D 2240/50* (2013.01); *F05D 2240/55* (2013.01)

(58) Field of Classification Search
CPC .......... F01D 25/16; F01D 25/18; F01D 11/00; F01D 11/02; F05D 2240/50;
(Continued)

(56) References Cited

U.S. PATENT DOCUMENTS

2009/0322031 A1*   12/2009   Roche ..................... F01D 11/02
                                                             277/348
2013/0156547 A1*   6/2013   Fang ....................... F01D 11/04
                                                             415/111

(Continued)

FOREIGN PATENT DOCUMENTS

DE      103 22 027 A1    12/2004
FR      3 056 656 A1    3/2018

OTHER PUBLICATIONS

International Search Report & Written Opinion issued Mar. 17, 2023 in PCT/FR2023/050244 filed Feb. 21, 2023, 14 pages (with English translation).

*Primary Examiner* — Elton K Wong
(74) *Attorney, Agent, or Firm* — Oblon, McClelland, Maier & Neustadt, L.L.P.

(57) ABSTRACT

A sealing system for a turbomachine bearing enclosure includes bearing with a stator carrying a rotor; a seal carried by the stator and surrounding the rotor; an external peripheral groove carried by the stator in the vicinity of the seal for collecting oil which exits the enclosure running along the rotor through the seal and which is centrifuged by the rotor towards this groove; and a drain at the bottom for discharging the oil from the groove. This groove is open towards the inside and is delimited by a base extended by two side walls, (Continued)

the side wall opposite the seal is extended by a skirt oriented obliquely towards the base to delimit a gutter opening towards the base.

10 Claims, 6 Drawing Sheets

(58) Field of Classification Search
CPC ........ F05D 2240/55; F02C 7/06; F16C 33/66; F16C 33/6637; F16C 33/6685; F16J 15/447; F16N 31/00
See application file for complete search history.

(56) References Cited

U.S. PATENT DOCUMENTS

2013/0283757 A1* 10/2013 Bordne ................ F02C 7/06
60/39.08
2018/0340439 A1* 11/2018 Vinski ................ F01D 25/16

* cited by examiner

SYSTEM FOR SEALING AND DRAINING OIL LEAKS FOR A TURBOMACHINE BEARING ENCLOSURE

TECHNICAL FIELD

The invention relates to a drainage cavity dedicated to collecting oil liable to leak through a seal that this cavity juxtaposes, in a sealing system incorporating this seal and this cavity.

PRIOR ART

On FIG. 1, a bypass turbojet engine 1 includes, at the upstream end AM thereof, an entry sleeve 2 wherein the external air is admitted before passing through a fan 3 including a series of rotary blades, in order next to be divided into a central primary flow and a secondary flow surrounding the primary flow.

The primary flow passes through a low-pressure compressor 4 and then a high-pressure compressor 5 before arriving in a combustion chamber 6, after which it expands through a high-pressure turbine 7 and then a low-pressure turbine 8 before being discharged towards the downstream end AV. As for the secondary flow, this is propelled directly downstream by the fan 3 in a duct delimited by the casing 9 to generate a thrust.

Such an engine includes a rotor rotating about its longitudinal axis AX, and including a plurality of discs each carrying at its periphery a series of blades or vanes, these discs corresponding to the fan, to the compressors and to the turbines.

In the case of a twin-spool turbojet engine, the high-pressure compressor and the high-pressure turbine form part of a high-pressure spool that surrounds a low-pressure shaft and rotates at a speed different from the latter, this low-pressure shaft carrying the low-pressure compressor and the low-pressure turbine. The shaft and the high-pressure spool are carried by bearings housed in lubrication chambers that isolate them from the rest of the engine.

Such a chamber is delimited by walls rotating with respect to each other with a seal between these walls, which limits the cross section of oil leakage. In a complementary manner, such a chamber is said to be pressurised, which in practice means that the interior of the chamber is at a pressure lower than that of its environment. Thus the oil is distanced from the seal by means of a stream of air continuously entering through this seal, from the outside towards the inside of the chamber.

On FIG. 2, a stator 11 carries on its internal face a circumferential seal 12 and an internal circumferential groove 13 turned towards the rotation axis AX of the engine and up against the downstream face of this seal 12. This groove 13 is connected to a drain 14 carried by the stator located at the bottom part thereof with respect to the vertical direction. A rotor 16 is engaged in this stator 11 while having its external face sliding against the seal 12, this rotor 16 including an external circumferential groove 17 located radially facing the groove 13.

The grooves 13 and 17 delimit a drainage cavity 18 connected to the drain 14 to form with the seal 12 a sealing system for a chamber E1 located upstream of this system. This drainage cavity 18 juxtaposes the seal 12 to collect oil liable to leak through this seal 12 while circulating from upstream AM to downstream AV from the chamber E1, to prevent it reaching a space E2 external to the chamber E1.

When the engine is horizontal, as in FIG. 2, the oil H passing through the seal 12 towards downstream while running along the rotor 16 is centrifuged by this rotor into the groove 13, in order then to be collected at the bottom part of the rotor by the drain 14. As can be seen on FIG. 2, the oil centrifuged into the groove 13 at the top part of the engine can trickle vertically along the downstream face of the groove 13 to be collected by the groove 17 and once again be centrifuged, so that it ends up reaching the bottom part of the groove 13 to be collected by the drain 14.

If the engine is inclined as on FIG. 3, for example when the aircraft is taking off, the oil centrifuged into the top part of the groove 13 that trickles along the downstream face of this groove 13 is able to emerge from this groove 13 through the gap I radially separating this stator groove 13 from the rotary groove 17.

As can be seen on FIG. 3, this emergence of oil is due to gravity, which tends to make it descend vertically while the downstream face of the groove 13 has an oblique orientation because of the inclination of the engine. In other words, it is because of the inclination of the engine with respect to the vertical that the oil is led to pass through the gap I to leak out of the cavity 18, and the fact that it is a case of a pressurised chamber does not suffice to counter this type of leak.

Leaks can also occur in situations where the chamber is not sufficiently pressurised, during a transient operating phase, for example when the engine is ticking over or stopped, or in the case of failure of the seal.

The aim of the invention is to provide a sealing system solution for reducing or even preventing leaks, towards the external space, of oil collected in the drainage cavity.

DISCLOSURE OF THE INVENTION

For this purpose, the object of the invention is a system for sealing and draining leaks of oil for a turbine-engine bearing chamber, this bearing comprising a stator carrying a rotor rotating about a rotation axis, this system comprising a seal carried by the stator and surrounding the rotor, an external circumferential groove carried by the stator while being contiguous with the seal to collect leaking oil travelling along the rotor through the seal and which is centrifuged by the rotor towards this circumferential groove, a drain located at the bottom part of the turbine engine for collecting the oil recovered by the circumferential groove, this circumferential groove being open towards the rotation axis while being delimited by a bottom extended by two lateral walls, the lateral wall opposite to the seal terminating in a gutter opening towards the bottom.

By virtue of the gutter carried by the lateral wall opposite to the seal, the oil centrifuged towards the bottom of the axial groove is necessarily collected by this gutter instead of falling onto the rotor to risk continuing its progress beyond the sealing system.

The invention thus makes it possible to best guide the leaks of oil towards the drain so that they do not pollute the rest of the engine, and this by adapting an already existing part.

The invention also relates to a sealing system thus defined, wherein the gutter is absent at the bottom part of the circumferential groove.

The invention also relates to a sealing system thus defined, wherein the bottom is formed by a frustoconical wall the inside diameter of which decreases on moving away from the seal.

The invention also relates to a sealing system thus defined, comprising an internal circumferential groove formed in the rotor facing the external circumferential groove, this internal circumferential groove having a length along the rotation axis that is less than the length of the external circumferential groove along the rotation axis.

The invention also relates to a sealing system thus defined, wherein the internal circumferential groove has a frustoconically shaped bottom the inside diameter of which decreases on moving away from the seal.

The invention also relates to a sealing system thus defined, wherein the rotor includes a circumferential rib terminating the internal circumferential groove.

The invention also relates to a sealing system thus defined, including knife-edge seals secured to the rotor sliding along a radially internal face of the gutter that is provided with abradable elements, to form a labyrinth seal.

The invention also relates to a turbine engine comprising a bearing chamber that is equipped with a sealing system thus defined.

Invention also relates to a turbine engine comprising a bearing chamber that is equipped with a sealing system thus defined.

DETAILED DISCLOSURE OF PARTICULAR EMBODIMENTS

The idea at the basis of the invention is improving the external groove so that it better captures the oil leaking through the seal.

Figure 1:
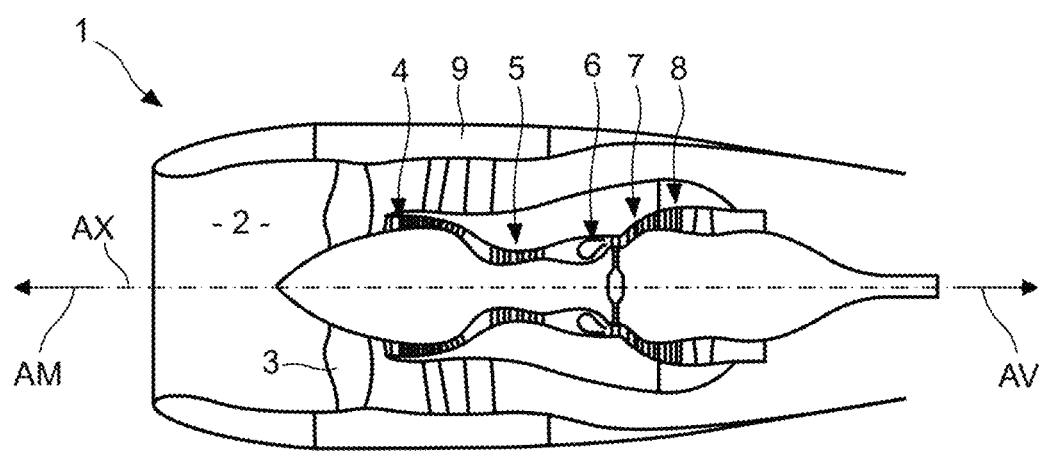
FIG. 1 is a view in longitudinal section of an engine of the turbojet engine type.
Figure 2:
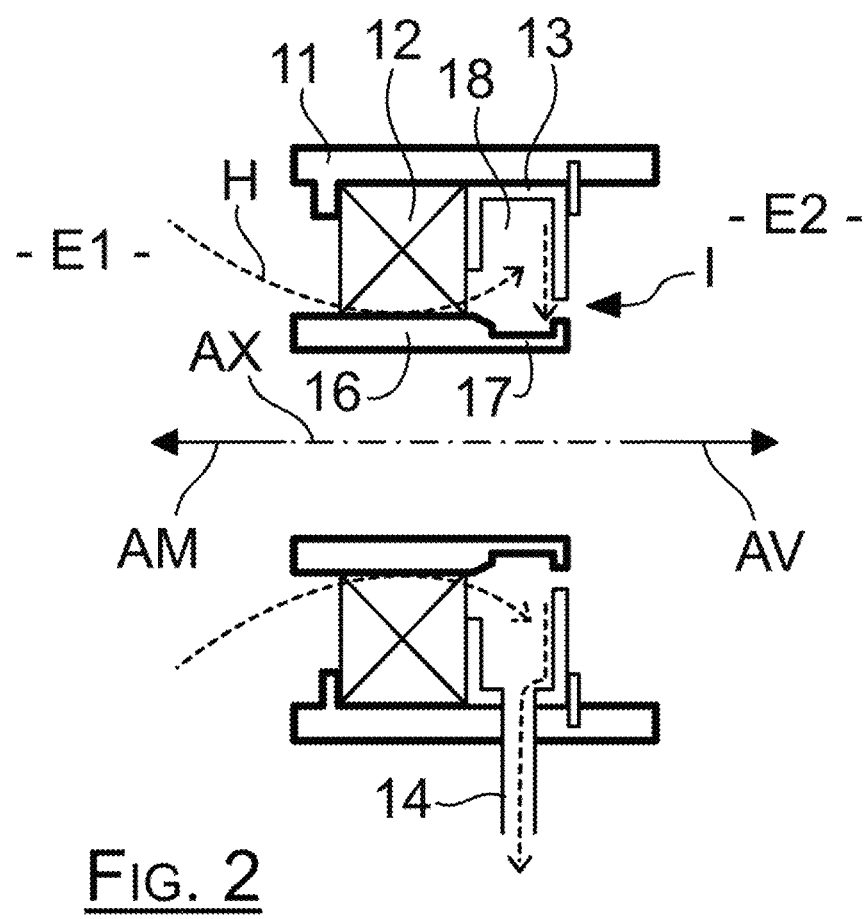
FIG. 2 is a view in longitudinal section of a known sealing system when the engine that it equips is horizontal.
Figure 3:
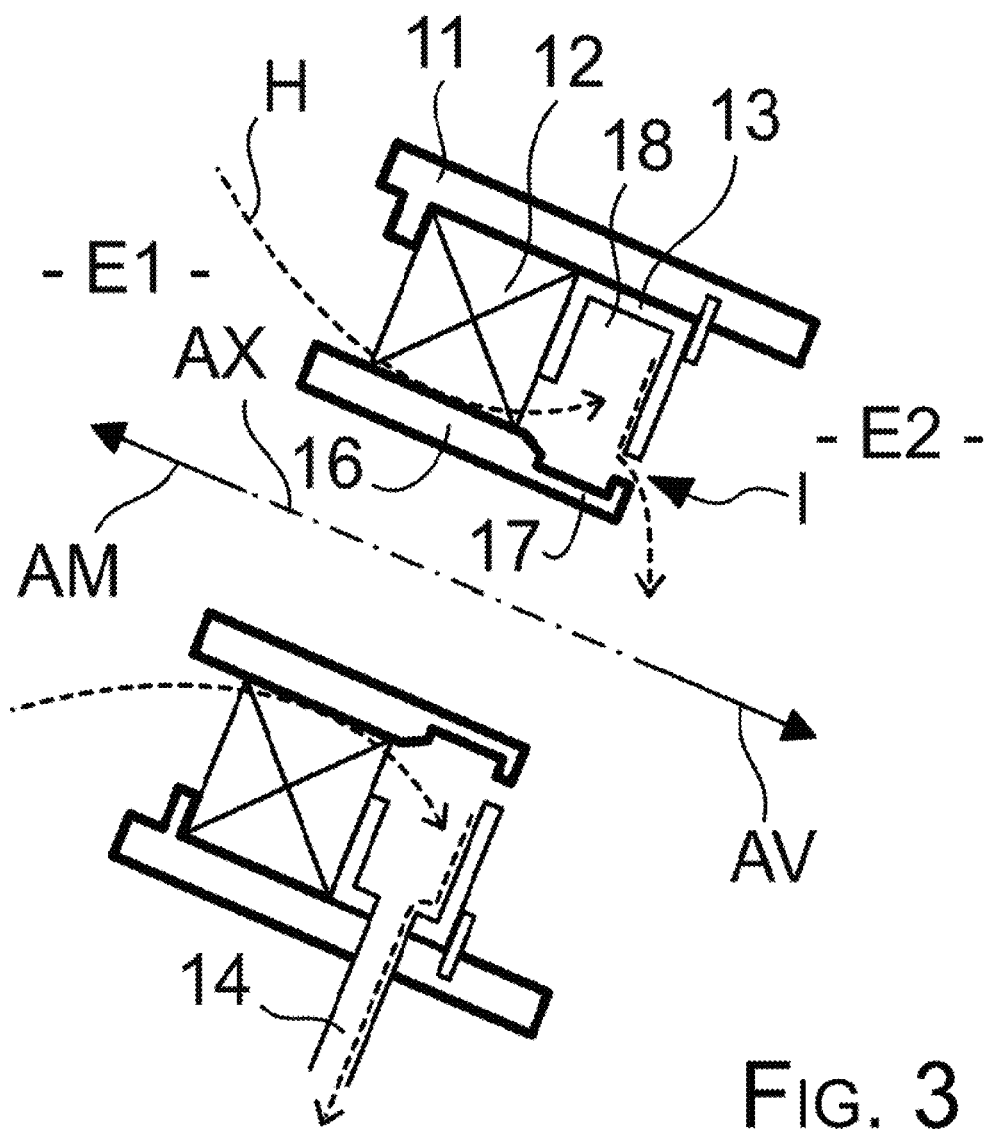
FIG. 3 is a view in longitudinal section of a known sealing system when the engine that it equips is inclined.
Figure 4:
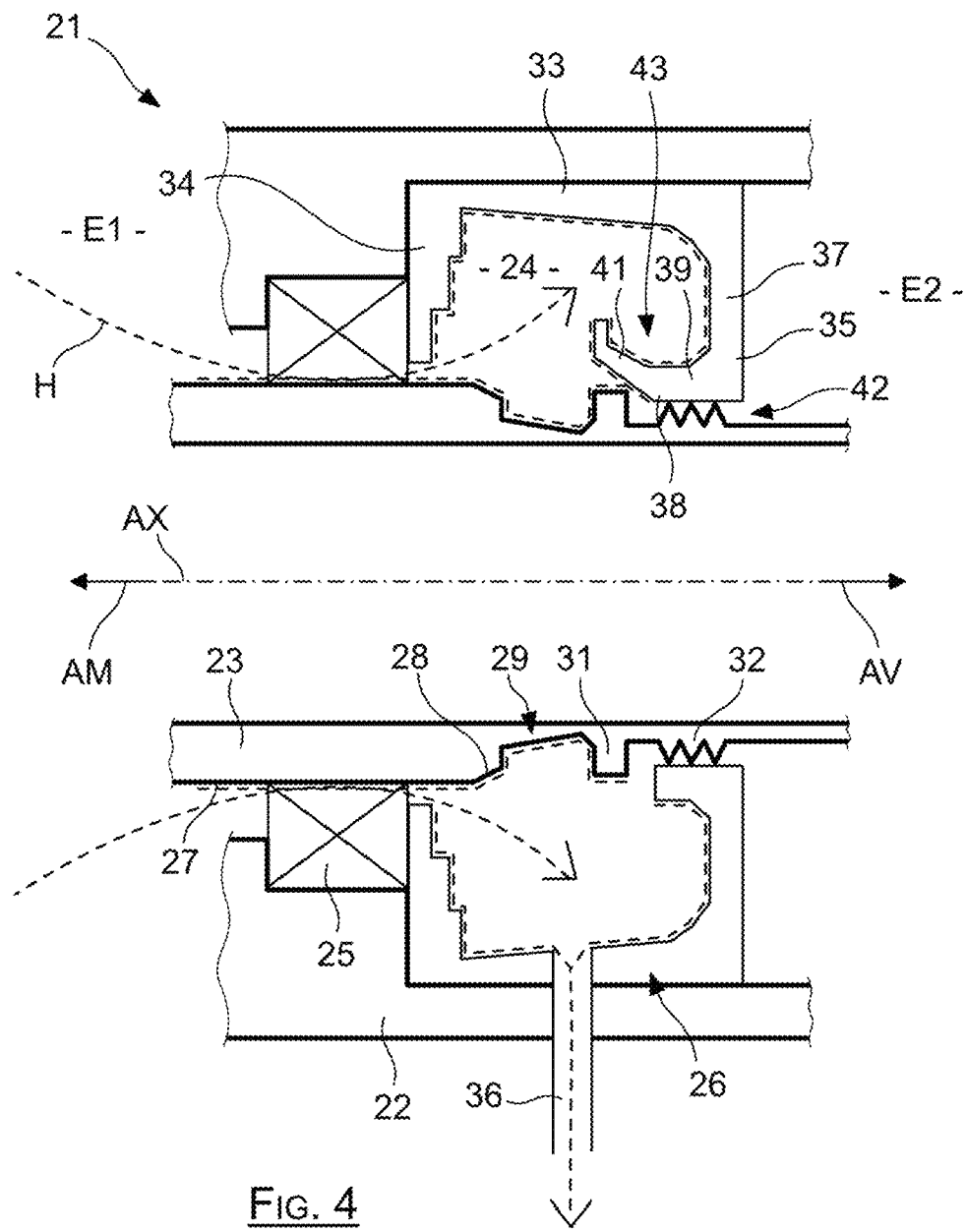
FIG. 4 is a view in longitudinal section of a sealing system according to the invention when the engine that it equips is horizontal.

On FIG. 4, a sealing system 21 provides a seal between a stator 22 surrounding a rotor 23 of a turbojet engine with rotation axis AX. This system opposes the passage of oil from a bearing chamber E1 located to the upstream AM of this sealing system 21, through a drainage cavity 24 that it includes, to a space E2 of the turbojet engine located outside the chamber E1 and which is located to the downstream AV of this system 21 in the example of the figures.

This system 21, which constitutes a sealing barrier, includes a seal 25 carried by the stator 22 and surrounding the rotor 23, which is here a segmented radial seal, and an external groove 26 carried by the stator 22 while being located immediately downstream of the seal 25, this external groove 26 being open towards the axis AX.

The rotor 23 has a shape of revolution including a cylindrical portion 27 at the seal 25 that is extended towards downstream AV by a conical portion or shoulder 28 delimiting a reduction in diameter, to the downstream of which an internal groove 29 extends, located radially facing the external groove 26 of the stator. Downstream of the groove 29, the rotor 23 includes a circumferential rib 31 advantageously followed by a sealing portion provided with three knife-edge seals 32.

The external groove 26 includes a bottom 33 extended by an upstream lateral wall 34 running along the seal 25 and a downstream lateral wall 35 opposite to the seal 25, the bottom and the lateral walls conjointly delimiting a corresponding shape similar to that of the letter U that is open in the direction of the axis AX.

In a complementary manner, a drain 36 located at the lowest point of the bottom 33 emerges in this bottom, so as to collect any oil that could accumulate in the bottom part of the groove 26, so as to return it for example to a dedicated recovery box.

The downstream lateral wall 35 includes a body 37 having the form of a ring with an orientation normal to the axis AX, and the radially internal edge of which is extended by an internal skirt 38 extending in the direction of the bottom 33. This internal skirt 38 includes in the example of the figures a cylindrical portion 39 running along the knife-edge seals 32 and which terminates in a conical portion 41 bringing it radially close to the bottom 33, so that it has a roughly annular shape that is splayed in the direction of the chamber E1.

The internal face of the cylindrical portion 39 includes abradable elements so as to constitute, with the knife-edge seals 32, a labyrinth seal 42 opposing the passage of oil towards the space E2. Other forms of the sealing portion that comprises the knife-edge seals 32 can be envisaged. It is also possible to dispense with such a sealing portion, or even to dispense with the labyrinth seal 42 overall, if the passage of oil towards the space E2 remains minimal and tolerable.

Figure 5:
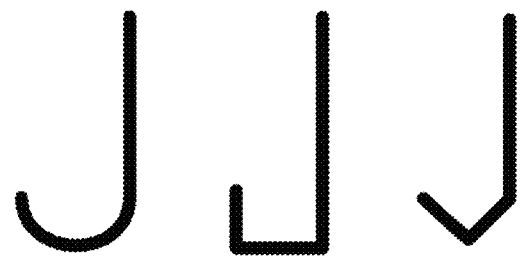
FIG. 5 is a schematic view showing three examples of possible profiles for the gutter of the external groove.

The internal skirt 38 delimits, with the downstream lateral wall 35, a gutter 43 extending in the groove 26. In the example of FIG. 4, this gutter 43 has a trapezoidal cross-section, but other forms are possible as illustrated on FIG. 5, such as for example a rounded, rectangular, triangular or other form.

In the case of a fault, or of operation with a pressure in the space E2 insufficient to prevent a leak of oil out of the chamber, the oil H that passes through the seal 25 while running along the external face of the cylindrical portion 27 of the rotor travels in the downstream direction AV, i.e. towards the groove 29, in the direction of the drainage cavity 24 juxtaposing this seal. When it travels towards or in the groove 29, this oil H is centrifuged by the rotation of the rotor 23, so that it is collected by the groove 26, at the bottom 33 thereof and/or at the lateral walls 34, 35 thereof.

As can be seen on FIG. 4, the bottom 33 has a truncated cone shape, the inside diameter of which decreases in the downstream direction AV, so that, at the top part of the engine, gravity acts on the oil collected on this bottom 33 so that it progresses spontaneously towards downstream AV.

At the top part of the engine, the oil collected by the conical bottom 33 is thus conveyed by the effect of gravity in the downstream direction AV in the direction of the lateral wall 35. After having joined the lateral wall 35, this oil descends in the gutter 43 by gravity effect, and then trickles circumferentially in this gutter 43 downwards. Once it has reached the bottom part of the engine, this oil leaves the gutter 43 to fall onto the bottom 33 and be recovered in the drain 36, which is located at the lowest point of the groove 26.

At the bottom part of the engine, the oil collected by the bottom 33 trickles along this bottom 33, until it reaches the drain 36, through which it is discharged.

Figure 6:
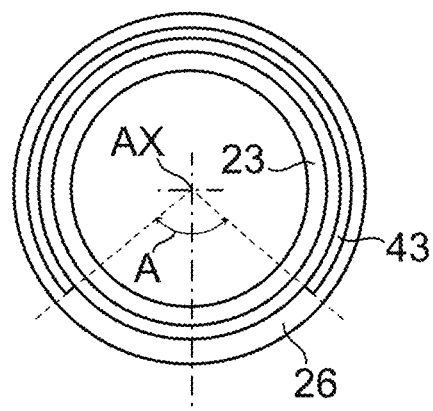
FIG. 6 is a view in cross section of the engine at the external groove.

On FIG. 4, the gutter 43 is absent in the lowest part of the engine, because it is advantageously removed over an angular extent A, on either side of the lowest point of the engine around the axis AX. This angular extent A, which appears on FIG. 6, can be between 5° and 60° and is advantageously equal to approximately 40°.

This angular extent with no gutter ensures that any oil that may have accumulated on the rib 31 of the rotor can trickle by gravity directly towards the bottom 33 when the engine is inclined. This avoids this oil being collected by the upstream face of the conical portion 41, which could then convey it downstream in the direction of the labyrinth seal 42.

As illustrated on the figures, the groove 26 can be provided in the form of a circular profiled member that is attached to the internal face of the stator 22, this profiled member including a portion with no gutter 43. Advantageously, this profiled member is provided with positive angular location so as to enable it to be angularly positioned suitably to ensure that the portion with no gutter 43 is located at the bottom part of the engine.

Figure 7:
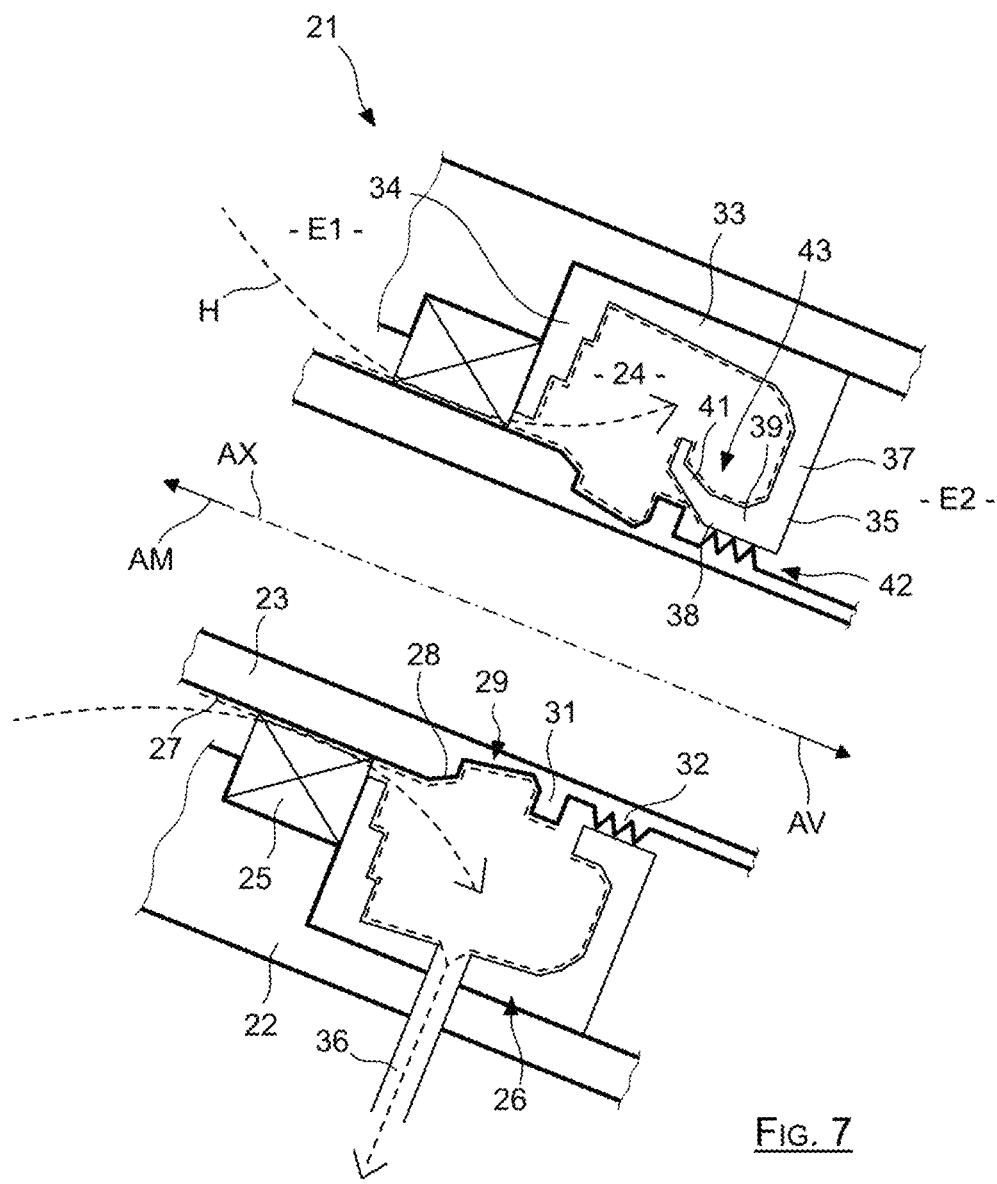
FIG. 7 is a view in longitudinal section of a sealing system according to the invention when the engine that it equips is inclined.

The invention makes it possible to limit losses of oil also when the engine is inclined, for example during a takeoff phase, as illustrated on FIG. 7. In this case, the leaking oil that has passed through the seal 25 and is sprayed into the groove 26 at the top part of the engine is first of all captured by the bottom 33 and by the lateral wall 35. It is next travels by gravity into the gutter 43, in order next to descend in this gutter 43 until it reaches a bottom part of the groove 26 so as to be collected therein by the bottom 33 in order next to be discharged through the drain 36. This oil of the top part thus cannot be directed towards the labyrinth seal 42, and is therefore not liable to emerge.

The oil that passes through the seal 25 at the bottom part of the engine for its part is collected almost directly by the bottom 33 and by the downstream lateral wall 35 to be recovered in the drain 36.

As can be seen in the bottom part of FIG. 7, the oil that can be present on the rib 31 in the bottom part of the engine can drip vertically under the effect of gravity into the bottom of the groove 33 without being intercepted by the gutter 43, which is absent in this region of the engine, so that it also does not risk passing through the labyrinth seal 42 to join the external space E2.

In a complementary fashion, in order to limit the quantity of oil present on the gutter 23, the bottom of the internal groove 29 has a conical shape, the diameter of which decreases in the downstream direction, so that any oil liable to be present in this groove is directed upstream by centrifugal effect. Under these conditions, this oil is naturally directed towards the upstream face of the groove 29, which is normal to the axis AX, so that it is spontaneously centrifuged to be collected by the bottom 33 of the external groove 26. The internal groove 29 thus constitutes a drip step at its upstream face.

More generally, the internal groove 29 has, along the axis AX, a length less than that of the external groove 26 while being located facing this external groove, to ensure that the oil captured in this internal groove is centrifuged into the wider external groove. This centrifugation occurs either at the upstream face of the internal groove or at the rib 31 delimiting the downstream face of this internal groove.

The invention claimed is:

1. A system for sealing and draining leaks of oil for a turbine-engine chamber enclosing a bearing, the system comprising:
    the bearing which comprises a stator and a rotor which is carried by the stator, the stator rotating about a rotation axis;
    a seal carried by the stator and surrounding the rotor;
    an external circumferential groove carried by the stator while being contiguous with the seal to collect leaking oil travelling along the rotor through the seal and which is centrifuged by the rotor towards the external circumferential groove; and
    a drain located at a lowest point of the external circumferential groove with respect to a vertical direction for collecting the oil recovered by the external circumferential groove, the external circumferential groove being open towards the rotation axis while being delimited by a bottom extended by upstream and downstream lateral walls, the downstream lateral wall that is opposite to the seal along the rotation axis terminating in a gutter opening towards the bottom.

2. The system according to claim 1, wherein the gutter is absent at the lowest point of the external circumferential groove with respect to the vertical direction.

3. The system according to claim 1, wherein the bottom is formed by a frustoconical wall, and an inside diameter of the frustoconical wall decreases on moving away from the seal.

4. The system according to claim 1, further comprising an internal circumferential groove formed in the rotor facing the external circumferential groove, the internal circumferential groove having a length along the rotation axis that is less than a length of the external circumferential groove along the rotation axis.

5. The system according to claim 4, wherein the internal circumferential groove has a frustoconically shaped bottom, and an inside diameter of the frustoconically shaped bottom decreases on moving away from the seal.

6. The system according to claim 4, wherein the rotor includes a circumferential rib terminating the internal circumferential groove.

7. The system according to claim 1, further comprising knife-edge seals secured to the rotor and sliding along a radially internal face of the gutter that is provided with abradable elements, to form a labyrinth seal.

8. A turbine engine comprising a bearing chamber that is equipped with a sealing system according to claim 1.

9. The system according to claim 1, wherein the gutter presents a trapezoidal cross-section.

10. The system according to claim 1, wherein the upstream wall runs along the seal.

* * * * *